(12) United States Patent
Sesser et al.

(10) Patent No.: US 11,613,878 B2
(45) Date of Patent: Mar. 28, 2023

(54) ADJUSTABLE DRAIN ASSEMBLY

(71) Applicant: Gregory Lee Sesser, Cambria, CA (US)

(72) Inventors: Gregory Lee Sesser, Cambria, CA (US); Michael William Johnson, Modesto, CA (US)

(73) Assignee: Gregory Lee Sesser, Cambria, CA (US)

( * ) Notice: Subject to any disclaimer, the term of this patent is extended or adjusted under 35 U.S.C. 154(b) by 294 days.

(21) Appl. No.: 17/112,716

(22) Filed: Dec. 4, 2020

(65) Prior Publication Data
US 2021/0180303 A1 Jun. 17, 2021

Related U.S. Application Data

(60) Provisional application No. 62/947,053, filed on Dec. 12, 2019.

(51) Int. Cl.
*E03C 1/232* (2006.01)
*F16L 27/12* (2006.01)

(52) U.S. Cl.
CPC .......... *E03C 1/232* (2013.01); *F16L 27/1273* (2019.08)

(58) Field of Classification Search
CPC .............................. E03C 1/232; F16L 27/1273
USPC ............................................................ 4/680
See application file for complete search history.

(56) References Cited

U.S. PATENT DOCUMENTS

| 3,495,280 | A | 2/1970 | Galbiati |
| 4,081,190 | A | 3/1978 | Itzler |
| 4,350,372 | A | 9/1982 | Logsdon |
| 4,352,213 | A | 10/1982 | Watts |
| 4,594,738 | A | 6/1986 | Gebert |
| 4,810,008 | A | 3/1989 | Brodie |
| 4,920,582 | A | 5/1990 | Alker |
| 6,681,420 | B1 * | 1/2004 | Ball .......................... E03C 1/24 4/680 |

(Continued)

FOREIGN PATENT DOCUMENTS

CN 205259285 U 5/2016

OTHER PUBLICATIONS

Angle Simple, Flexible Extension Drain Pipe, retrieved from: https://www.amazon.com/Flexible-Extension-Angle-Simple-Tailpiece/dp/B07FKLBNXR on Sep. 10, 2020, 9 pgs.

*Primary Examiner* — Tuan N Nguyen
(74) *Attorney, Agent, or Firm* — Foley & Lardner LLP

(57) ABSTRACT

An adjustable drain assembly is disclosed. The adjustable drain assembly may have a main drain body with a series of springable flanges and extension calibration elements. Other components of the adjustable drain assembly may provide fluid conduits from various drains, such as of a bath tub, and may connect to the main drain body. These other components may be insertable into the springable flanges and may have extension calibration elements interlockable with the extension calibration elements of the main body. A collet may be disposable about the springable flanges and configured to retain the extension calibration elements in fixed interlocking relation. In this manner, the other components may be adjustably positioned in lengthwise relation relative to the main drain body, then secured in position by the fixation of the extension calibration elements in fixed interlocking relation.

20 Claims, 7 Drawing Sheets

(56) References Cited

U.S. PATENT DOCUMENTS

| | | |
|---|---|---|
| 6,685,162 B2 | 2/2004 | Carpenter |
| 8,234,726 B2 | 8/2012 | Shafik |
| 9,896,827 B1 * | 2/2018 | Hsieh ............... E03C 1/232 |
| 2004/0034926 A1 | 2/2004 | Ball |
| 2008/0047060 A1 | 2/2008 | Ball |
| 2008/0155745 A1 | 7/2008 | Burr |

* cited by examiner

ADJUSTABLE DRAIN ASSEMBLY

CROSS-REFERENCE TO RELATED APPLICATIONS

This application claims the benefit of and priority to U.S. Prov. Pat. App. No. 62/947,053, filed on Dec. 12, 2019, and entitled "'No Tool' Adjustable Bath Tub Waste & Overflow Assembly," the disclosure of which is hereby incorporated by reference in its entirety.

FIELD

The present disclosure relates generally to drain assemblies, and more specifically, to adjustable drain assemblies.

BACKGROUND

Installing drain assembly, such as a bath tub waste and overflow assembly can be a challenging and frustrating plumbing job. With minimal working room, getting exact measurements can be tough while working in the installation site. Solvent joint waste assemblies are difficult to measure in the installation site and messy to glue, thus often leading to settling for an unsatisfactory result. Further, slip joint, nut and washer assemblies are difficult to tighten within the installation site. Additionally, a slip waste assembly is not advisable to test or snake. Thus there remains a need for an adjustable drain assembly, including an adjustable bath tub waste and overflow assembly.

SUMMARY

An adjustable drain assembly is provided. The adjustable drain assembly may include a main drain body, an overflow riser, and a slidable collet. The main drain body may be T-shaped conduit having a first series of springable flanges extending from a first end of the T-shaped conduit and having inner surfaces comprising a first set of extension calibration elements. The overflow riser may be at least partially insertable into an opening at least partially defined by the first series of springable flanges and having an outer surface having a second set of extension calibration elements interlockable with the first set of extension calibration elements. The slidable collet may be disposable about an exterior face of the first series of springable flanges and configured to retain the first and second series of extension calibration elements in fixed interlocking relation, whereby the overflow riser resists movement into or out of the first end of the T-shaped conduit.

In various embodiments, the T-shaped conduit has a second series of springable flanges extending from a second end of the T-shaped conduit and having inner surfaces providing a third set of extension calibration elements. The adjustable drain assembly may also include drain arm at least partially insertable into an opening at least partially defined by the second series of springable flanges and having an outer surface providing a fourth set of extension calibration elements interlockable with the third set of extension calibration elements. Moreover, there may be a slidable collet disposable about an exterior face of the second series of springable flanges and configured to retain the third and fourth series of extension calibration elements in fixed interlocking relation, whereby the drain arm resists movement into or out of the second end of the T-shaped conduit.

In various embodiments, the T-shaped conduit has a third series of springable flanges extending from a third end of the T-shaped conduit and having inner surfaces providing a fifth set of extension calibration elements. The adjustable drain assembly may also include an outflow arm at least partially insertable into an opening at least partially defined by the third series of springable flanges and having an outer surface including a sixth set of extension calibration elements interlockable with the fifth set of extension calibration elements. A slidable collet may be disposable about an exterior face of the third series of springable flanges and configured to retain the fifth and sixth series of extension calibration elements in fixed interlocking relation, whereby the outflow arm resists movement into or out of the third end of the T-shaped conduit.

The adjustable drain assembly may include a tub overflow attachment member coupled to the overflow riser. A tub drain attachment member may be coupled to the drain arm. A waste outlet attachment member may be coupled to the outflow arm. The overflow riser may be configured to be extend from the main body between a range of 0.1-7 inches. An extension limit element may be configured to prevent the overflow riser from moving into the main body past a certain distance. Sealing elements may be disposed around the overflow riser configured to seal the overflow riser with the main body.

An adjustable drain assembly may have a main drain body, an overflow riser, a drain arm, an outflow arm, a first collet, a second collet, and a third collet. The main drain body may be a T-shaped conduit having a first, second, and third series of springable flanges extending from a first, send, and third end of the T-shaped conduit and having inner surfaces providing a first, second, and third set of extension calibration elements, respectively. The overflow riser may be at least partially insertable into an opening at least partially defined by the first series of springable flanges and having an outer surface including a second set of extension calibration elements interlockable with the first set of extension calibration elements. The drain arm may be at least partially insertable into an opening at least partially defined by the second series of springable flanges and having an outer surface providing a fourth set of extension calibration elements interlockable with the third set of extension calibration elements. The outflow arm may be at least partially insertable into an opening at least partially defined by the third series of springable flanges and having an outer surface providing a sixth set of extension calibration elements interlockable with the fifth set of extension calibration elements. The first collet may be disposable about an exterior face of the first series of springable flanges and configured to retain the overflow riser within the main body. The second collet may be disposable about an exterior face of the second set of springable flanges and configured to retain the drain arm within the main body. The third collet may be disposable about an exterior face of the third series of springable flanges and configured to retain the outflow arm within the main body.

The adjustable drain assembly may also include a tub overflow attachment member coupled to the overflow riser, a tub drain attachment member coupled to the drain arm, and a waste outlet attachment member coupled to the outflow arm.

A method of using an adjustable drain assembly is provided. The method may include providing a main drain body having a T-shaped conduit having a first series of springable flanges extending from a first end of the T-shaped conduit and having inner surfaces providing a first set of extension calibration elements. The method may include adjusting an overflow riser at least partially inserted into an opening at least partially defined by the first series of springable flanges and having an outer surface providing a second set of extension calibration elements interlockable with the first set of extension calibration elements. The method may include locking the overflow riser in position relative to the main drain body via a slidable collet disposed about an exterior face of the first series of springable flanges, whereby the overflow riser resists movement into or out of the first end of the T-shaped conduit.

The method may also include unlocking the overflow riser via the slidable collet to readjust the overflow riser within the main body. Moreover, the method may include providing the T-shaped conduit with a second series of springable flanges extending from a second end of the T-shaped conduit and having inner surfaces providing a third set of extension calibration elements. The method may include adjusting a drain arm at least partially inserted into an opening at least partially defined by the second series of springable flanges and having an outer surface providing a fourth set of extension calibration elements interlockable with the third set of extension calibration elements. Finally, the method may include locking the drain arm in position relative to the main body via a slidable collet disposed about an exterior face of the second series of springable flanges, whereby the drain arm resists movement into or out of the second end of the T-shaped conduit.

In various embodiments, the method includes providing the T-shaped conduit with a third series of springable flanges extending from a third end of the T-shaped conduit and having inner surfaces providing a fifth set of extension calibration elements. The method may include adjusting an outflow arm at least partially inserted into an opening at least partially defined by the third series of springable flanges and having an outer surface providing a sixth set of extension calibration elements interlockable with the fifth set of extension calibration elements. Finally, the method may include locking the outflow arm in position relative to the main body via a slidable collet disposable about an exterior face of the third series of springable flanges, whereby the outflow arm resists movement into or out of the third end of the T-shaped conduit. In various embodiments, adjusting the overflow riser includes moving the overflow riser in or out of the main body a range of 0.1-3 inches.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

Figure 1:
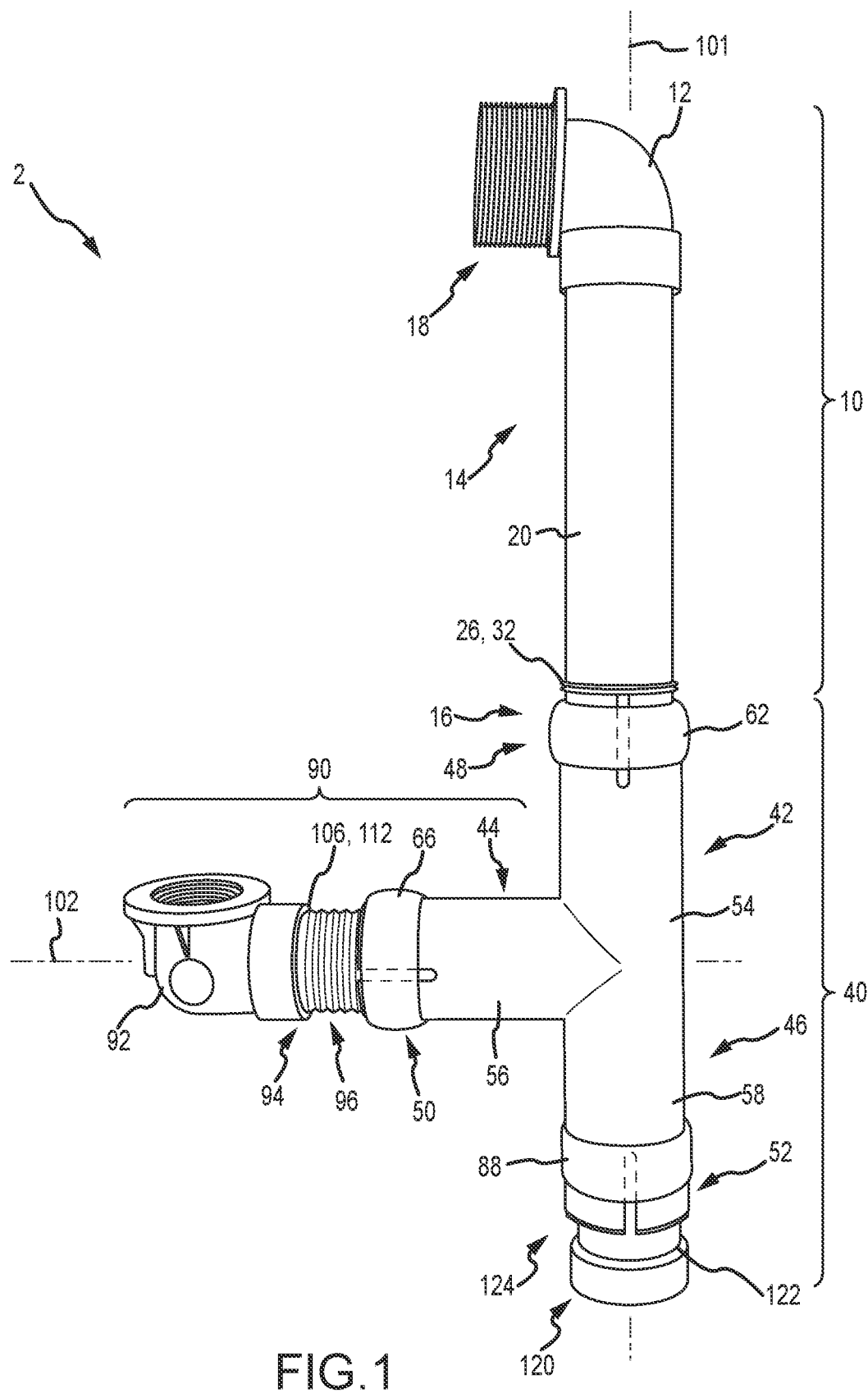
FIG. 1 illustrates an adjustable drain assembly, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

To be oriented "outward" of an object means having a position farther from a shared reference point than the object. For example, to be outward of a longitudinal axis relative to an object means having a distance from the longitudinal axis, a lateral vector component of which is greater than that of a corresponding lateral vector component of the distance of the object from the shared longitudinal axis.

Similarly, as used herein a "direction" and an "opposing direction" comprise directions having a vector component extending at least partially in opposite directions, such as wherein the statement pointing in a "first direction" means having a vector component extending at least partially opposite an "opposing second direction."

Finally, as used herein "forward" and "aft" may describe relative positions along a longitudinal axis relative to another object. For example, forward may mean toward to an end position of an article along the longitudinal axis. For instance forward, with reference to a threaded portion of a bolt, would mean nearer to the threaded tip and not the head of the bolt. Aft means the opposite of forward. For example, a nut is typically forward of a washer when attached to a bolt, whereas a washer is typically aft of a nut when attached to a bolt.

Referring now to the figures generally, an adjustable drain assembly is provided. The adjustable drain assembly may be an adjustable tub waste and overflow assembly. This assembly may be used for targeting the slab-on-grade application, while being functional for most standard tub waste installations. For example, the adjustable tub waste and overflow assembly may be applicable with a variety of drains, such as toe taps, lift-and-turns, link ad cables, etc. By utilizing mechanical slip joints, O-ring seals, and locking collars, this assembly does not require any tools and is fully adjustable. Advantageously, the adjustable tub waste assembly improves efficiency and offers an improvement over current slip joints or solvent joints. Further, the adjustable tub waste and overflow assembly can withstand hydrostatic testing of approximately 5 pounds, for instance, and is durable enough to snake.

As such, a pipe assembly that connects to the drain and waste overflow outlets on a bathtub to drain the water is provided, wherein the assembly is made of pieces that can telescope and nest at each joint so that the assembly can be installed without cutting and measuring. This adjustability may be created with ratcheting interlockable grooves and collet rings that fix waste and overflow attachments in a user-settable location within a telescoping channel of a T-shaped pipe.

With reference to FIGS. 1-7 an adjustable drain assembly 2 is provided. The adjustable drain assembly 2 comprises an overflow riser 10, a main body 40, a drain arm 90, and an outflow arm 120 that couple together to form the adjustable drain assembly 2.

Referring to FIGS. 1, 2A, 2B, and 7, the overflow riser 10 may include a primary portion 14. The primary portion 14 forms the main portion (e.g., the majority of the length) of the overflow riser 10 and is formed from a fluid conduit 20 having a first end and a second end. The primary portion 14 may run along a central longitudinal axis 101. The primary portion 14 is cylindrical and defines a cavity therein.

The overflow riser 10 may include an angled portion 12. The angled portion 12 is coupled to the first end of the primary portion 14. The angled portion 12 is generally an "L" shape with a first portion having a first opening and a second portion having a second opening. The first and second portions may form a curved piece. The first opening is configured to couple to the primary portion 14 such that the first portion extends along the central longitudinal axis 101. The second portion curves away from the first portion to at least partially extend away from the first portion along a central lateral axis 202 perpendicular to the central longitudinal axis 101 such that the second opening faces outward from the primary portion 14. While discussed with reference to longitudinal and lateral axes above, one may further understand that the second portion of angled portion 12 may curve away from the first portion of angled portion 12 at other than perpendicular angles, so that angled portion 12 is a shape other than an "L" shape. For instance, the angled portion 12 may be a variety of shapes other than "L" shaped, for instance, providing a 30 degree, 45 degree, 60 degree, or other angle, as desired. Moreover, second portion may not curve from first portion, so that the angled portion 12 has abrupt angles, rather than a curve. For instance, second portion may abruptly angle relative to first portion such that acute, obtuse, or corner features may be provided.

The angled portion 12 may include a tub overflow attachment member 18 which may be an outward threaded face proximate the second opening. The outward threaded face may end in a radially extending flange. The outward threaded face may be forward of the radially extending flange. The outward threaded face may be configured to threadably attach to a separate tub component such that the radially extending flange stops and/or seals the separate tub component with the angled portion 12. The angled portion 12 and the primary portion 14 may be removably coupled (e.g., threaded, snapped, etc.), permanently coupled (e.g., glued, melted, etc.), or formed as a single integral component. Consequently, the outward threaded face may be inserted into an opening of a bathtub, stopped and sealed by the radially extending flange, and may be attached to the bathtub, so that fluid may exit an overflow drain of the bath tub into the angled portion 12 and through the primary portion 14, being carried away from the bath tub.

The overflow riser 10 includes a main body attachment member 16. The main body attachment member 16 includes a plug extensible joint member 22. The plug extensible joint member 22 may be rotatable and extensible (e.g., extendable, movable, etc.) relative to the main body 40, as described herein. The main body attachment member 16 comprises a portion of the fluid conduit 20 of the primary portion 14. The main body attachment member 16 may be an exterior face of the fluid conduit 20. The main body attachment member may be a collection of features, such as ridges, stops, seals, and/or the like. The main body attachment member 16 may include a feature termed a plug extensible joint member 22. The plug extensible joint member 22 may be a portion of the exterior face of the fluid conduit 20. This portion may be made up of a series of ridges and/or channels.

The plug extensible joint member 22 may move and extend along the central longitudinal axis 101. For instance, the plug extensible joint member 22 may slide into and out of the main body 40 along the central longitudinal axis 101. The main body attachment member 16 includes a plurality of extension calibration elements 24 (e.g., ridges 30) which selectably engage with aspects of the main body 40 to selectably fix an amount of extension of the plug extensible joint member 22 along the central longitudinal axis 101.

The extension calibration elements 24 may be disposed around the main body attachment member 16. For instance the extension calibration elements 24 may be annular rings around an outer surface of the fluid conduit 20, such as an outer surface of the main body attachment member 16. The extension calibration elements 24 may be evenly spaced along the main body attachment member 16.

The main body attachment member 16 includes an extension limit element 26 configured to prevent the overflow riser 10 from moving into the main body 40 beyond a certain distance. For instance, the extension limit element 26 may interface (e.g., meets, stops, etc.) with a rim of the main body 40. The extension limit element 26 may be disposed proximate the second end of the primary portion 14 and include an annular ring 32. The annular ring 32 is disposed around the main body attachment member 16 proximate to the second end of primary portion 14.

The main body attachment member 16 may also include sealing elements 28. Sealing elements 28 may comprise any structure configured to ameliorate fluid leakage between a joining of the overflow riser 10 and the main body 40. The sealing elements 28 include a first O-ring 34 and a second O-ring 36. The sealing elements 28 may be disposed around the main body attachment member 16 proximate to the end of the main body attachment member 16, so that the sealing elements 28 are insertable into main body 40 and seal a gap between the main body 40 and the overflow riser 10.

Referring to FIGS. 1, 3A, 3B, and 7, the drain arm 90 includes a primary portion 94 formed from a fluid conduit 100 having a first end and a second end. The primary portion 94 may extend along the central lateral axis 202 corresponding to one or more aspect of a main body 40 of the adjustable drain assembly 2. In various instances, the primary portion 94 aligns with and is connectable to a tub arm 44 of the main body 40. In various instances, the primary portion 94 is at least partially insertable into the tub arm 44 of the main body. The drain arm 90 may be shorter than the overflow riser 10. In further instances, the drain arm 90 is the same length as the overflow riser 10. In further instances, the drain arm 90 is longer than the overflow riser 10. The primary portion 94 is cylindrical and defines a cavity therein.

The drain arm 90 includes an angled portion 92. The angled portion 92 is coupled to the second end of the primary portion 94. The angled portion 92 is generally an "L" shape with a first portion having a first opening and a second portion having a second opening. The first and second portions may form a curved piece. The first opening is configured to receive and couple to the primary portion 94. In further embodiments there is no first opening and the angled portion 92 is instead integrally formed with and a single piece of material with the primary portion 94 at the aforementioned location where the first opening would receive and couple to the primary portion. The second portion extends away from the first portion such that the second opening faces outward from the primary portion 94. In various embodiments, the second portion extends away from the first portion parallel to the central longitudinal axis 101 such that the second opening faces outward from the primary portion 94.

The angled portion 92 includes a tub drain attachment member 98 which may include a drain shoe. The tub drain attachment member 98 may have threads on an inner circumference of an opening of the angled portion 92. As such, one may say that the tub drain attachment member has an inner threaded face proximate the second opening. The inner threaded face may be configured to threadably attach to a separate drain component, such as a drain of a bath tub. The angled portion 92 and the primary portion 94 may be removably coupled (e.g., threaded, snapped, etc.), permanently coupled (e.g., glued, melted, etc.), or formed as a single integral component.

The drain arm 90 includes a main body attachment member 96. The main body attachment member 96 includes a plug extensible joint member 102. The plug extensible joint member 102 may be rotatable and extensible (e.g., extendable, movable, etc.) relative to the main body 40, as described herein. The main body attachment member 96 comprises a portion of the fluid conduit 100 of the primary portion 94 of the drain arm. The main body attachment member 96 may be an exterior face of the fluid conduit 100. The main body attachment member may be a collection of features, such as ridges, stops, seals, and/or the like. The main body attachment member 96 may include a feature termed a plug extensible joint member 102. The plug extensible joint member 102 may be a portion of the exterior face of the fluid conduit 100. This portion may be made up of a series of ridges and/or channels.

The plug extensible joint member 102 may move and extend along the along the central lateral axis 202. For instance, the plug extensible joint member 102 may slide into and out of the main body 40 along the central lateral axis 202. The main body attachment member 96 includes a plurality of extension calibration elements 104 (e.g., ridges 110) which selectably engage with aspects of the main body 40 to selectably fix an amount of extension of the plug extensible joint member 102 along the central lateral axis 202.

The extension calibration elements 104 may be disposed around the main body attachment member 96. For instance, the extension calibration elements 24 may be annular rings around an outer surface of the fluid conduit 100, such as an outer surface of the main body attachment member 96. The extension calibration elements 104 may be evenly spaced along the main body attachment member 96.

The main body attachment member 96 includes an extension limit element 106 configured to prevent the drain arm 90 from moving into the main body 40 beyond a certain distance. For instance, the extension limit element 106 may interface (e.g., meets, stops, etc.) with a rim of the main body 40. The extension calibration elements 104 may be disposed proximate the second end of the primary portion 94 and includes an annular ring 112. The annular ring 112 is disposed around the main body attachment member 96 proximate to the second end of the primary portion 94.

The main body attachment member 96 may also include sealing elements 108. Sealing elements 108 may comprise any structure configured to ameliorate fluid leakage between a joining of the drain arm 90 and the main body 40. The sealing elements 108 may include a first O-ring 114 and a second O-ring 116. The sealing elements 108 may be disposed around the main body attachment member 96 proximate to the end of the main body attachment member 96, so that the sealing elements 108 are insertable into main body 40 and seal a gap between the main body 40 and the drain arm 90.

Referring to FIGS. 1, 4A, 4B, and 7, the outflow arm 120 includes a primary portion 122 formed from a fluid conduit 128 having a first end and a second end. The primary portion 122 may extend along the central longitudinal axis 101 corresponding to one or more aspect of a main body 40 of the adjustable drain assembly 2. In various embodiments, the primary portion 122 aligns with and is connectable to an exit arm 46 of the main body 40. In various instances, the outflow arm is at least partially insertable into the exit arm 46 of the main body 40. The primary portion 122 is cylindrical and defines a cavity therein. The primary portion 122 includes a waste outlet attachment member 126 configured to couple to a separate drain component. For example, the waste outlet attachment member 126 comprises a pipe fitting configured to connect to a building's plumbing.

The outflow arm 120 includes a main body attachment member 124. The main body attachment member 124 includes a plug extensible joint member 130. The plug extensible joint member 130 may be rotatable and extensible (e.g., extendable, movable, etc.) relative to the main body 40, as described herein. The main body attachment member 124 comprises a portion of the fluid conduit 128 of the primary portion 122 of the outflow arm 120. The main body attachment member 124 may be an exterior face of the fluid conduit 128. The main body attachment member 124 may be a collection of features, such as ridges, stops, seals, and/or the like. The main body attachment member 124 may include a feature termed a plug extensible joint member 130. The plug extensible joint member 130 may be a portion of the exterior face of the fluid conduit 128. This portion may be made up of a series of ridges and/or channels.

The plug extensible joint member 130 may move and extend along the central longitudinal axis 101. For instance, the plug extensible joint member 130 may slide into and out of the main body 40 along the central longitudinal axis 101. The main body attachment member 124 includes a plurality of extension calibration elements 132 (e.g., ridges 138) which selectably engage with aspects of the main body 40 to selectably fix an amount of extension of the plug extensible joint member 102 along the central longitudinal axis 101.

The extension calibration elements 132 may be disposed around the main body attachment member 124. For instance the extension calibration elements 132 may be annular rings around an outer surface of the main body attachment member 124. The extension calibration elements 132 may be evenly spaced along the main body attachment member 124.

The main body attachment member 124 includes an extension limit element 134 configured to prevent the outflow arm 120 from moving into the main body 40 beyond a certain distance. For instance, the extension limit element 134 may interface (e.g., meets, stops, etc.) with a rim of the main body 40. The extension limit element 134 may be disposed proximate the second end of the primary portion 122 and includes an annular ring 140. The annular ring 140 is disposed around the main body attachment member 124 proximate to the second end of the primary portion 122.

The main body attachment member 124 may also include sealing elements 136. Sealing elements 108 may comprise any structure configured to ameliorate fluid leakage between a joining of the outflow arm 120 and the main body 40. The sealing elements 108 may include a first O-ring 142 and a second O-ring 144. The sealing elements 136 may be disposed around the main body attachment member 124 proximate to the end of the main body attachment member 124, so that the sealing elements 108 are insertable into main body 40 and seal a gap between the main body 40 and the outflow arm 120.

Referring to FIGS. 1 and 5-7, the discussion is now directed to the main body 40 of the adjustable drain assembly 2 and various features of the main body 40. In various embodiments, the main body 40 includes an overflow arm 42 comprising a fluid conduit 54. A fluid conduit may define a channel through the overflow arm 42 in which a fluid may travel. The overflow arm 42 extends along the central longitudinal axis 101. The main body 40 includes a tub arm 44 comprising a fluid conduit 56. The fluid conduit may define a channel through the tub arm 44 and define a channel through the tub arm 44 in which a fluid may travel. The fluid conduits of the various features of the main body 40 may be in fluidic communication to permit comingling of the fluid. The tub arm 44 may be formed from a fluid conduit 56 extending along the central lateral axis 202. The main body 40 includes an exit arm 46 comprising a fluid conduit 58, extending along to the central longitudinal axis 101 and similarly in fluidic communication with the other fluid conduits of the main body 40. The overflow arm 42 and the exit arm 46 may be contiguous with the tub arm 44 extending therefrom, thus forming the main body 40 to be a "T" shape. In various embodiments, other shapes are contemplated, for example, the main body 40 may by a "Y" shape. The main body 40 may be any other shape as desired.

Figure 2A:
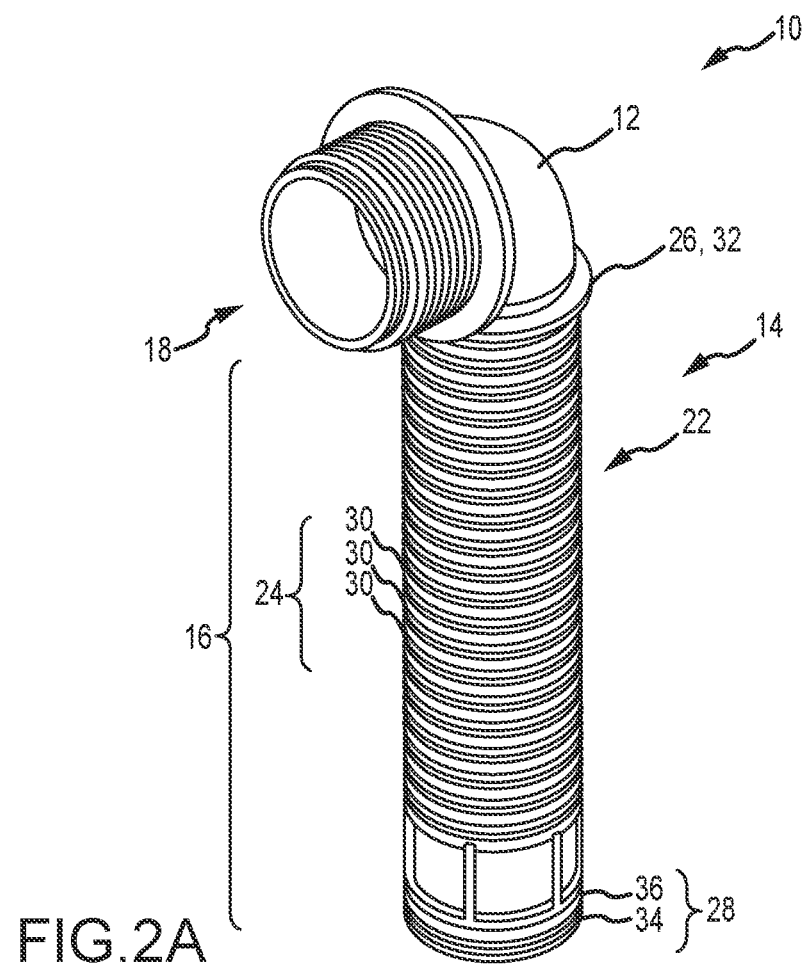
FIGS. 2A and 2B illustrate an overflow riser of the adjustable drain assembly of FIG. 1, in accordance with various embodiments.
Figure 2B:
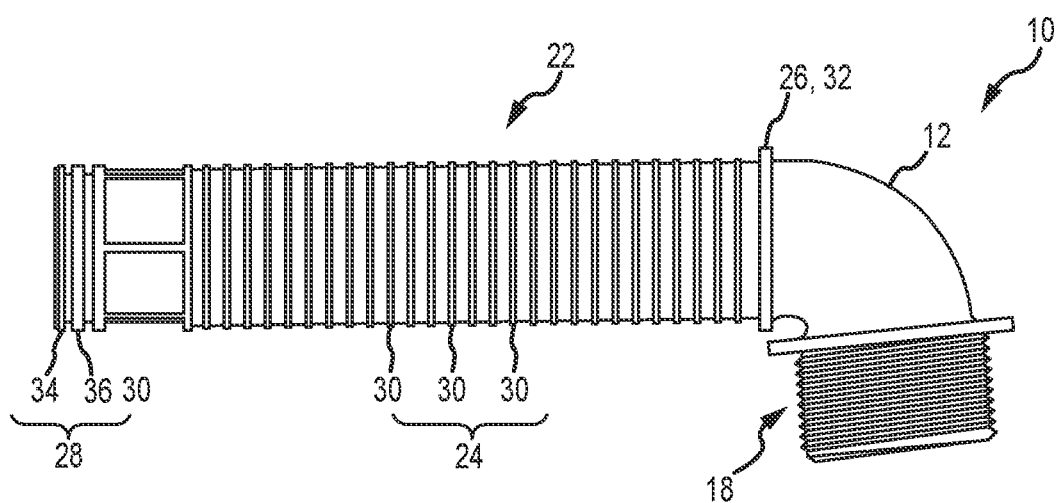

The main body 40 includes an overflow arm attachment member 48. The overflow arm attachment member 48 is any aspect configured to attach to and/or receive the overflow riser 10. The overflow arm attachment member 48 may have a receptacle joint member 60. The receptacle joint member 60 receives an aspect of the overflow riser 10 into the receptacle joint member 60 for joining therewith. For example the receptacle joint member 60 may springable flanges 70, relief grooves 72, and extension calibration elements 74 (e.g., ridges). The receptacle joint member 60 is disposed at a first end of the main body 40. The receptacle joint member 60 defines a first opening of the first end of the main body 40. The springable flanges 70 may be flexible flanges separated by the relief grooves 72 disposed along the first opening such that the springable flanges 70 can angle in toward the central longitudinal axis 101 or away from the central longitudinal axis 101 (e.g., narrowing or expanding the first opening). The extension calibration elements 74 are disposed along an inner surface of the springable flanges 70. For instance, the inner surface may be lined with ridges configured to engage and interlock with the ridges 30 (FIGS. 2A, 2B) of the overflow riser 10 (FIGS. 2A, 2B). The first opening is configured to receive the overflow riser 10. For instance the springable flanges 70 may allow insertion of the main body attachment member 16 (FIGS. 2A, 2B) into the main body 40 up to the extension limit element 26 (FIGS. 2A, 2B). The overflow arm attachment member 48 includes a compression sleeve 62 (e.g., slidable collet). The compression sleeve 62 is disposed around the receptacle joint member 60 and movable along the central longitudinal axis 101. For instance, the user may adjust the overflow riser 10 to the desired length depending on the installation site and tub. The compression sleeve 62 may remain at or moved below the springable flanges 70 during insertion of the overflow riser 10 to allow flexibility and receipt of the overflow riser 10. Once the overflow riser 10 is in position and the corresponding ridges are engaged, the compression sleeve 62 may then be placed over the springable flanges 70 to limit their flexibility (e.g., outward movement) and secure the overflow riser 10 to the main body 40. The overflow riser 10 is configured to allow approximately a 5 inch adjustment range (e.g., +/−1.2 inch, 3.75 inch, 5.1 inch, etc.).

Figure 3A:
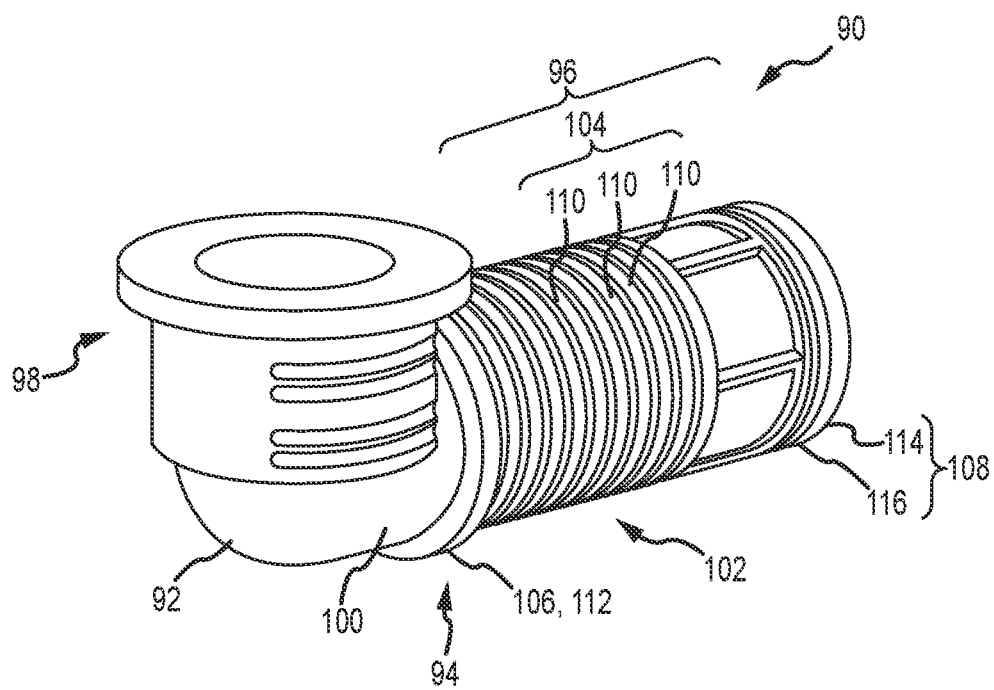
FIGS. 3A and 3B illustrate a drain arm of the adjustable drain assembly of FIG. 1, in accordance with various embodiments.
Figure 3B:
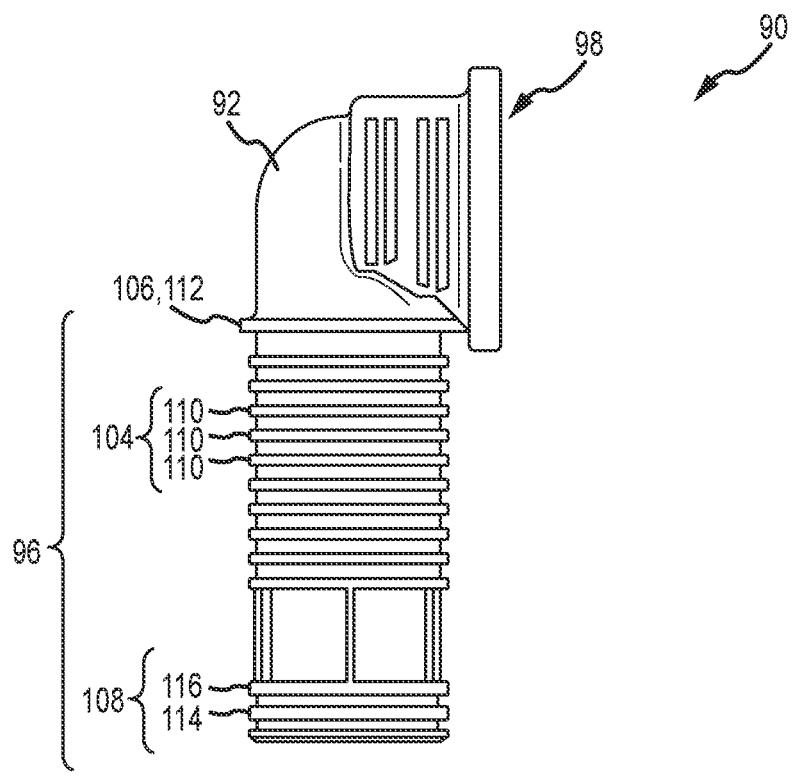

The main body 40 includes a tub arm attachment member 50. The tub arm attachment member 50 is any aspect configured to attach to and/or receive the drain arm 90. The tub arm attachment member 50 may have a receptacle joint member 64. The receptacle joint member 64 receives an aspect of the drain arm 90 into the receptacle joint member 64 for joining therewith. For example, the receptacle joint member 60 may include springable flanges 76, relief grooves 78, and extension calibration elements 80 (e.g., ridges). The receptacle joint member 64 is disposed at a second end of the main body 40. The receptacle joint member 64 defines a second opening of the second end of the main body 40. The springable flanges 76 may be flexible flanges separated by the relief grooves 78 disposed along the second opening such that the springable flanges 76 can angle in toward the central longitudinal axis 101 or away from the central longitudinal axis 101 (e.g., narrowing or expanding the second opening). The extension calibration elements 80 are disposed along an inner surface of the springable flanges 76. For instance, the inner surface may be lined with ridges configured to engage and interlock with the ridges 110 (FIGS. 3A, 3B) of the drain arm 90 (FIGS. 3A, 3B). The second opening is configured to receive the drain arm 90. For instance the springable flanges 76 may allow insertion of a main body attachment member 96 (FIGS. 3A, 3B) into the main body 40, up to an extension limit element 106 (FIGS. 3A, 3B). The tub arm attachment member 50 includes a compression sleeve 66 (e.g., slidable collet). The compression sleeve 66 is disposed around the receptacle joint member 64 and movable along the central longitudinal axis 101. For instance, the user may adjust the drain arm 90 to the desired length depending on the installation site and tub. The compression sleeve 66 may remain at or moved below the springable flanges 76 during insertion of the drain arm 90 to allow flexibility and receipt of the drain arm 90. Once the drain arm 90 is in position and the corresponding ridges are engaged, the compression sleeve 66 may then be placed over the springable flanges 76 to limit their flexibility (e.g., outward movement) and secure the drain arm 90 to the main body 40. The drain arm 90 is configured to allow approximately a 3 inch adjustment range (e.g., +/−0.2 inch, 1.75 inch, 3.1 inch, etc.).

Figure 4A:
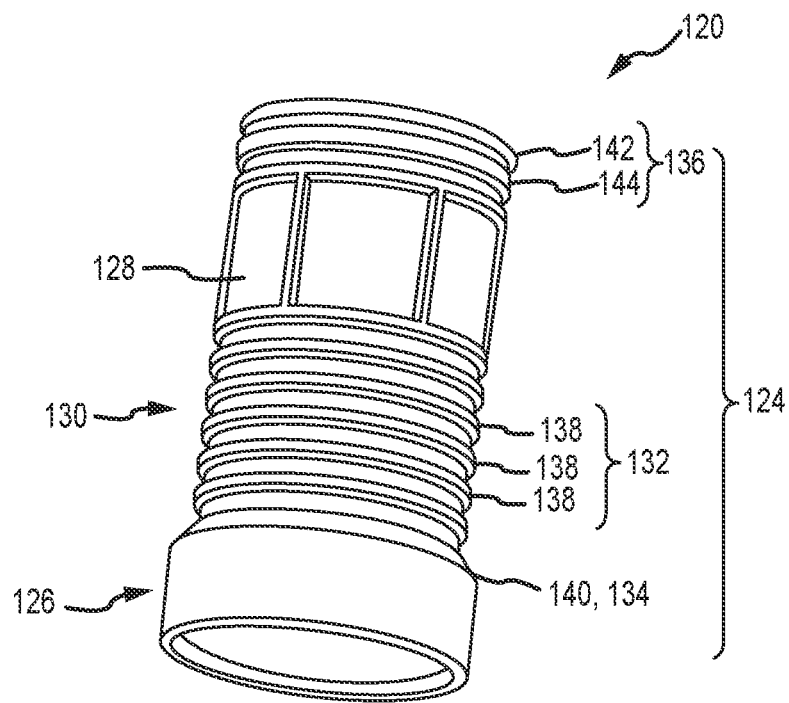
FIGS. 4A and 4B illustrate an outflow arm of the adjustable drain assembly of FIG. 1, in accordance with various embodiments.
Figure 4B:
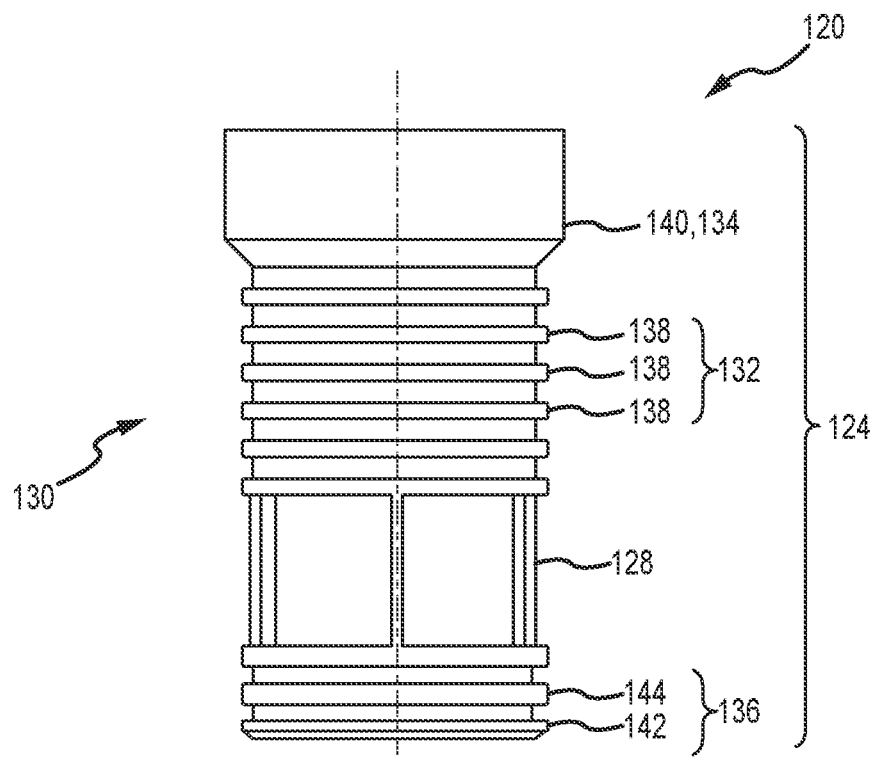
Figure 5:
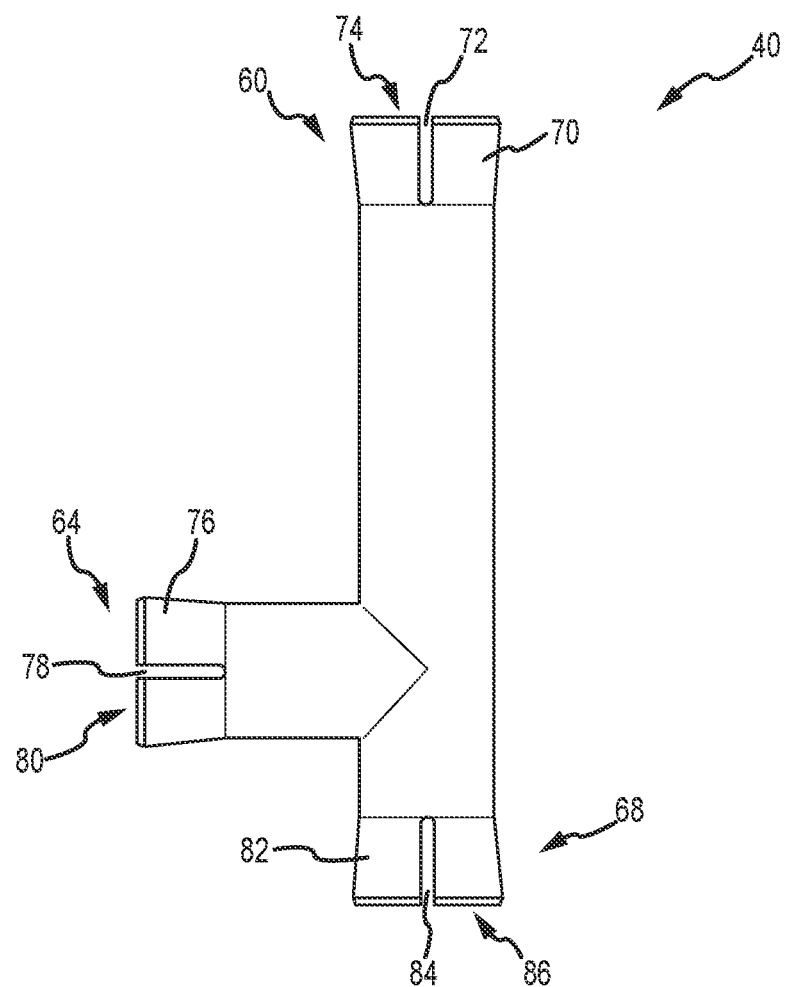
FIG. 5 illustrates a main body of the adjustable drain assembly of FIG. 1, in accordance with various embodiments.
Figures 6A, 6B:
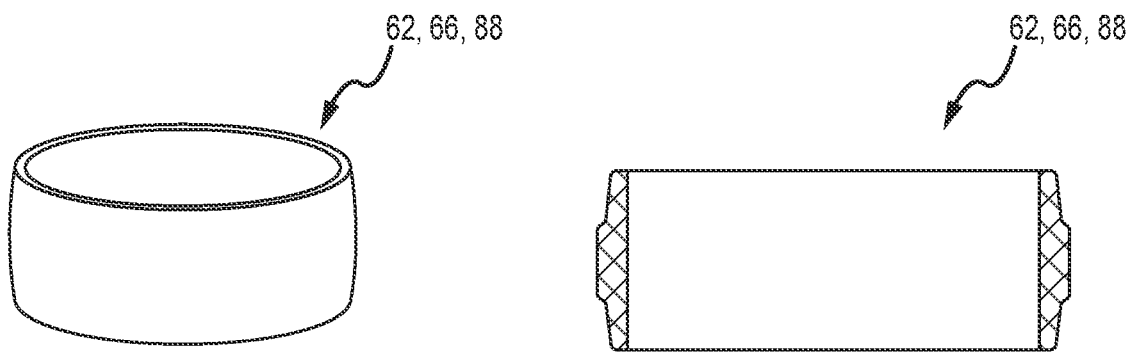
FIGS. 6A and 6B illustrate a compression sleeve of the adjustable drain assembly of FIG. 1, in accordance with various embodiments.
Figure 7:
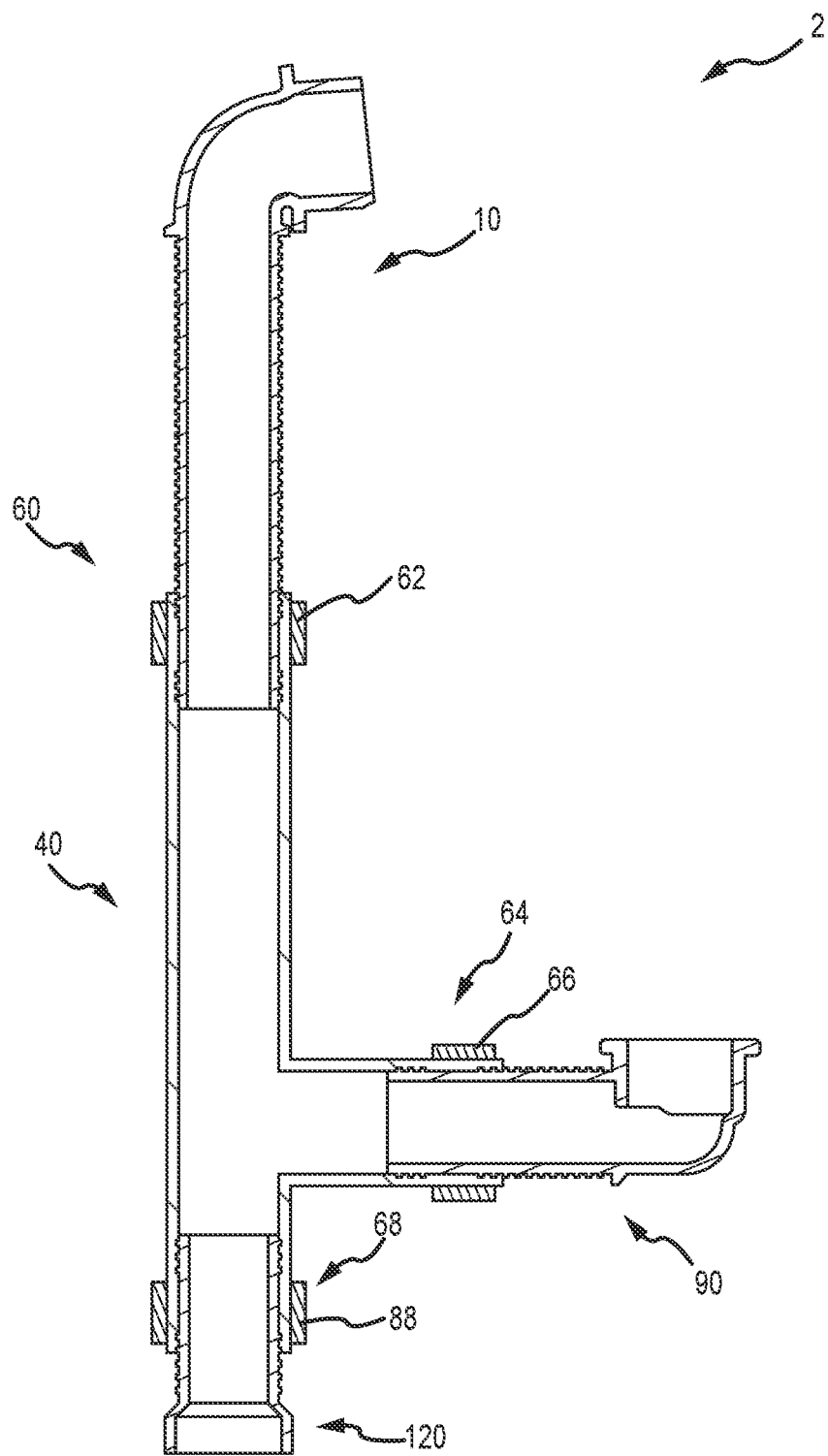
FIG. 7 illustrates a cutaway view of an adjustable drain assembly, in accordance with various embodiments.

The main body 40 includes an outflow arm attachment member 52. The outflow arm attachment member 52 is any aspect configured to attach to and/or receive the outflow arm 120. The outflow arm attachment member 52 may have a receptacle joint member 68. The receptacle joint member 68 receives an aspect of the outflow arm 120 into the receptacle joint member 68 for joining therewith. For example, the receptacle joint member 68 may include springable flanges 82, relief grooves 84, and extension calibration elements 86. The receptacle joint member 68 is disposed at a third end of the main body 40. The receptacle joint member 68 defines a third opening of the third end of the main body 40. The springable flanges 82 may be flexible flanges separated by the relief grooves 84 disposed along the third opening such that the springable flanges 82 can angle in toward the central longitudinal axis 101 or away from the central longitudinal axis 101 (e.g., narrowing or expanding the first opening). The extension calibration elements 86 are disposed along an inner surface of the springable flanges 82. For instance, the inner surface may be lined with ridges configured to engage and interlock with the ridges 138 (FIGS. 4A, 4B) of the outflow arm 120 (FIGS. 4A, 4B). The third opening is configured to receive the outflow arm 120. For instance the springable flanges 82 may allow insertion of a main body attachment member 124 (FIGS. 4A, 4B) into the main body 40 up to an extension limit element 134 (FIGS. 4A, 4B). The outflow arm attachment member 52 includes a compression sleeve 88 (e.g., slidable collet). The compression sleeve 88 is disposed around the receptacle joint member 68 and movable along the central longitudinal axis 101. For instance, the user may adjust the outflow arm 120 to the desired length depending on the installation site and tub. The compression sleeve 88 may remain at or moved below the springable flanges 82 during insertion of the outflow arm 120 to allow flexibility and receipt of the outflow arm 120. Once the outflow arm 120 is in position and the corresponding ridges are engaged, the compression sleeve 88 may then be placed over the springable flanges 82 to limit their flexibility (e.g., outward movement) and secure the outflow arm 120 to the main body 40. The outflow arm 120 is configured to allow approximately a 1 inch adjustment range (e.g., +/−0.2 inch, 0.75 inch, 1.1 inch, etc.). This +/−1 inch range allows for a mechanical correction of this highly critical and hard-to-get measurement down to the trap. Additionally, an added feature to being vertically adjustable is that the trap would have 360 degrees to swivel on the outflow arm 120. As such, the adjustable drain assembly 2 aids in the final glue joint of the trap, as well as drainage arm connections.

Figure 8:
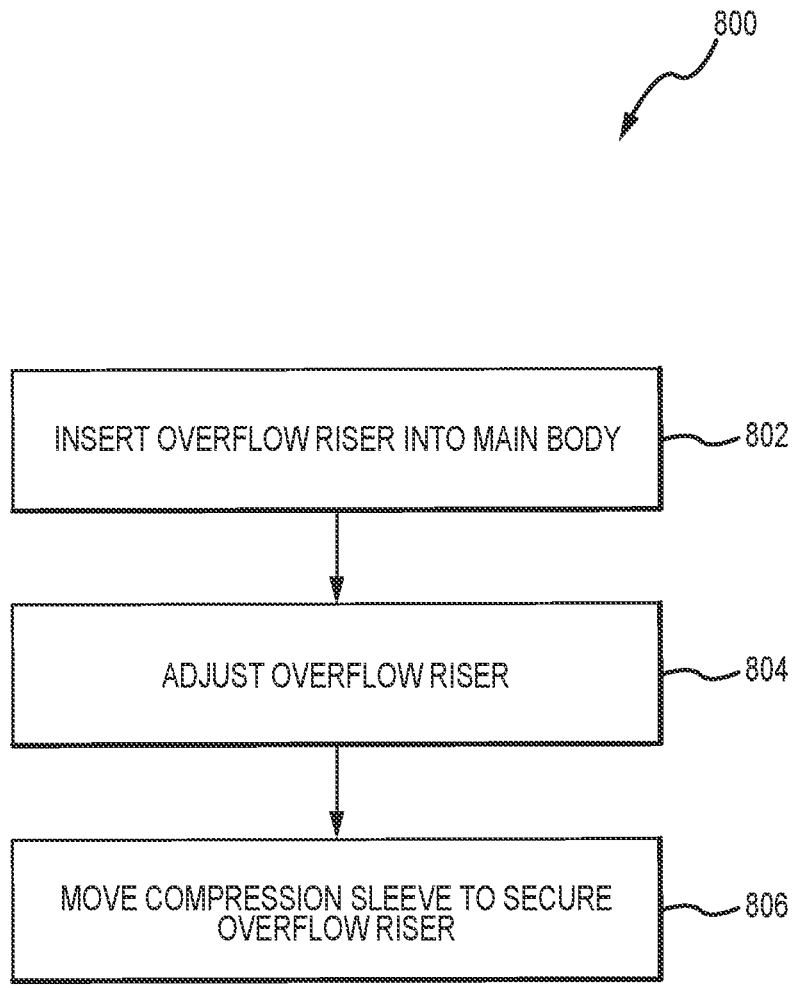
FIG. 8 illustrates an example method of using the adjustable drain assembly of FIG. 1, in accordance with various embodiments.

With reference to FIG. 8 and with ongoing reference to FIGS. 1-7, a method 800 of using an adjustable drain assembly 2 is provided. In various embodiments, a compression sleeve 62 may remain at or be moved below a springable flanges 70 to allow flexibility of the springable flanges 70 and insertion of an overflow riser 10 (block 802). The overflow riser 10 is then adjusted (block 804). For instance, the user may adjust the overflow riser 10 to a desired length depending on the installation site and tub. Once the overflow riser 10 is in position and the corresponding ridges are engaged, the compression sleeve 62 may then be placed over the springable flanges 70 to limit their flexibility (e.g., outward movement) and secure the overflow riser 10 to the main body 40 (block 806). In this manner, the adjustable tub assembly may be installed without any tools and provide for use with various applications, tubs, and installation conditions.

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An adjustable drain assembly comprising:
   a main drain body comprising a T-shaped conduit having a first series of springable flanges extending from a first end of the T-shaped conduit and having inner surfaces comprising a first set of extension calibration elements;
   an overflow riser at least partially insertable into an opening at least partially defined by the first series of springable flanges and having an outer surface comprising a second set of extension calibration elements interlockable with the first set of extension calibration elements; and
   a slidable collet disposable about an exterior face of the first series of springable flanges and configured to retain the first and second series of extension calibration elements in fixed interlocking relation, whereby the overflow riser resists movement into or out of the first end of the T-shaped conduit.

2. The adjustable drain assembly of claim 1, wherein the T-shaped conduit has a second series of springable flanges extending from a second end of the T-shaped conduit and having inner surfaces comprising a third set of extension calibration elements.

3. The adjustable drain assembly of claim 2, further comprising a drain arm at least partially insertable into an opening at least partially defined by the second series of springable flanges and having an outer surface comprising a fourth set of extension calibration elements interlockable with the third set of extension calibration elements.

4. The adjustable drain assembly of claim 3, further comprising a slidable collet disposable about an exterior face of the second series of springable flanges and configured to retain the third and fourth series of extension calibration elements in fixed interlocking relation, whereby the drain arm resists movement into or out of the second end of the T-shaped conduit.

5. The adjustable drain assembly of claim 3, further comprising a tub drain attachment member coupled to the drain arm.

6. The adjustable drain assembly of claim 1, wherein the T-shaped conduit has a third series of springable flanges extending from a third end of the T-shaped conduit and having inner surfaces comprising a fifth set of extension calibration elements.

7. The adjustable drain assembly of claim 6, further comprising an outflow arm at least partially insertable into an opening at least partially defined by the third series of springable flanges and having an outer surface comprising a sixth set of extension calibration elements interlockable with the fifth set of extension calibration elements.

8. The adjustable drain assembly of claim 7, further comprising a slidable collet disposable about an exterior face of the third series of springable flanges and configured to retain the fifth and sixth series of extension calibration elements in fixed interlocking relation, whereby the outflow arm resists movement into or out of the third end of the T-shaped conduit.

9. The adjustable drain assembly of claim 7, further comprising a waste outlet attachment member coupled to the outflow arm.

10. The adjustable drain assembly of claim 1, further comprising a tub overflow attachment member coupled to the overflow riser.

11. The adjustable drain assembly of claim 1, wherein the overflow riser is configured to be extend from the main body between a range of 0.1-7 inches.

12. The adjustable drain assembly of claim 1, further comprising an extension limit element configured to prevent the overflow riser from moving into the main body past a certain distance.

13. The adjustable drain assembly of claim 1, further comprising sealing elements disposed around the overflow riser configured to seal the overflow riser with the main body.

14. An adjustable drain assembly comprising:
    a main drain body comprising a T-shaped conduit having a first, second, and third series of springable flanges extending from a first, send, and third end of the T-shaped conduit and having inner surfaces comprising a first, second, and third set of extension calibration elements, respectively;
    an overflow riser at least partially insertable into an opening at least partially defined by the first series of springable flanges and having an outer surface comprising a second set of extension calibration elements interlockable with the first set of extension calibration elements;
    a drain arm at least partially insertable into an opening at least partially defined by the second series of springable flanges and having an outer surface comprising a fourth set of extension calibration elements interlockable with the third set of extension calibration elements;
    an outflow arm at least partially insertable into an opening at least partially defined by the third series of springable flanges and having an outer surface comprising a sixth set of extension calibration elements interlockable with the fifth set of extension calibration elements;
    a first collet disposable about an exterior face of the first series of springable flanges and configured to retain the overflow riser within the main body;
    a second collet disposable about an exterior face of the second set of springable flanges and configured to retain the drain arm within the main body; and
    a third collet disposable about an exterior face of the third series of springable flanges and configured to retain the outflow arm within the main body.

15. The adjustable drain assembly of claim 14, further comprising:
    a tub overflow attachment member coupled to the overflow riser;
    a tub drain attachment member coupled to the drain arm; and
    a waste outlet attachment member coupled to the outflow arm.

16. A method of using an adjustable drain assembly comprising:
    providing a main drain body comprising a T-shaped conduit having a first series of springable flanges extending from a first end of the T-shaped conduit and having inner surfaces comprising a first set of extension calibration elements;
    adjusting an overflow riser at least partially inserted into an opening at least partially defined by the first series of springable flanges and having an outer surface comprising a second set of extension calibration elements interlockable with the first set of extension calibration elements; and
    locking the overflow riser in position relative to the main drain body via a slidable collet disposed about an exterior face of the first series of springable flanges, whereby the overflow riser resists movement into or out of the first end of the T-shaped conduit.

17. The method of claim 16, further comprising unlocking the overflow riser via the slidable collet to readjust the overflow riser within the main body.

18. The method of claim 16 further comprising:
providing the T-shaped conduit with a second series of springable flanges extending from a second end of the T-shaped conduit and having inner surfaces comprising a third set of extension calibration elements;
adjusting a drain arm at least partially inserted into an opening at least partially defined by the second series of springable flanges and having an outer surface comprising a fourth set of extension calibration elements interlockable with the third set of extension calibration elements; and
locking the drain arm in position relative to the main body via a slidable collet disposed about an exterior face of the second series of springable flanges, whereby the drain arm resists movement into or out of the second end of the T-shaped conduit.

19. The method of claim 16, further comprising:
providing the T-shaped conduit with a third series of springable flanges extending from a third end of the T-shaped conduit and having inner surfaces comprising a fifth set of extension calibration elements;
adjusting an outflow arm at least partially inserted into an opening at least partially defined by the third series of springable flanges and having an outer surface comprising a sixth set of extension calibration elements interlockable with the fifth set of extension calibration elements; and
locking the outflow arm in position relative to the main body via a slidable collet disposable about an exterior face of the third series of springable flanges, whereby the outflow arm resists movement into or out of the third end of the T-shaped conduit.

20. The method of claim 16, wherein adjusting the overflow riser comprises moving the overflow riser in or out of the main body a range of 0.1-3 inches.

* * * * *